3,462,256
PROCESS FOR PRODUCING UREA-FORMALDE-
HYDE AQUEOUS CONCENTRATES
Ged H. Justice, New York, N.Y., and Richard E. Formaini, Colonial Heights, Va., assignors to Allied Chemical Corporation, New York, N.Y., a corporation of New York
No Drawing. Filed Oct. 31, 1966, Ser. No. 591,033
Int. Cl. C05c 9/02
U.S. Cl. 71—28    7 Claims

ABSTRACT OF THE DISCLOSURE

Aqueous solutions of 80–90% partially reacted urea and formaldehyde in mol ratio of 1–2:1 is prepared by adding 0.3–6% ammonia to an aqueous mixture of the partially reacted urea and formaldehyde, heating the mixture at pH 8.5–10, then at pH 7–8.5 until 50–80% of the formaldehyde is in the form of methylene groups. The resulting clear solution is stable for at least 30 days at 20°–25° C. and for at least 7 days at 0° C.

---

This invention relates to stable urea-formaldehyde concentrates containing urea and formaldehyde in a mol ratio of at least 1:1 and particularly characterized by their stability at low temperatures, and to the method for their production.

Urea-formaldehyde concentrate solutions have been used in the resin and fertilizer industries for many years. Such products have previously been characterized by a solids content of about 60 to 90% and a urea:formaldehyde mol ratio substantially less than 1:1. It has long been recognized that it would be particularly advantageous in the fertilizer industry to have a urea formaldehyde concentrate solution in which the mol ratio of urea to formaldehyde is greater than 1:1, thereby providing a higher weight percentage of available nitrogen.

The prior art describes a process for producing high urea formaldehyde concentrates which are aqueous suspensions of urea and formaldehyde which will remain as flowable mixtures at ambient temperatures for at least 30 days. As is well known, fertilizers are generally applied in the early spring. This timetable necessitates the shipment of bulk quantities of the fertilizer ingredients at times of the year when temperatures near or below 0° C. are likely to be encountered. It has been found that high urea concentrates heretofore proposed have exhibited a tendency to become turbid and precipitate solids in cold weather unless transported and stored in expensive temperature controlled tanks. Such precipitated solids are difficult to remove from the tanks in which the condensates are shipped and stored and cannot be pumped or otherwise handled by the apparatus normally used for such solutions.

In view of the foregoing it is an object of the present invention to provide urea formaldehyde condensate solutions which contain a high percentage of urea, are stable for extended periods at normal room temperatures and can be subjected to temperatures as low as 0° C. without precipitating solid material.

It is another object of this invention to provide a method for preparing such stable condensates.

It is another object of this invention to provide improved fertilizer solutions based on urea-formaldehyde concentrates.

Other objects and advantages will become apparent to those skilled in the art from the following description of our invention wherein parts and percentages are by weight and temperatures are in degrees centigrade, unless otherwise specified.

The novel urea formaldehyde concentrates of the present invention are aqueous solutions containing about 80 to 90% by weight partially reacted urea and formaldehyde in mol ratio above 1:1 but less than 2:1 which will remain substantially clear solutions for at least about 30 days at about 20° to 25° C. and will not "salt out," i.e., precipitate solid material, at temperatures as low as 0° C. for at least 7 days.

The products of our invention are prepared by a process which comprises preparing an aqueous mixture of urea and formaldehyde having a urea:formaldehyde mol ratio above 1:1 but less than 2:1, adding ammonia in an amount of 0.3% to 6% by weight of the urea and formaldehyde, heating said mixture at a temperature between about 75° C. and boiling while maintaining the pH of the mixture in the range of about 8.5 to 10, preferably 9.0 to 9.8, with strong alkali until at least about 90% of the formaldehyde is in combined form, with at least 60% of the formaldehyde in the form of methylol compounds, and then continuing said heating at pH 7 to 8.5, preferably 7.3 to 7.9 until at least 50%, but no more than 80%, preferably 60 to 70% of the formaldehyde is in the form of methylene groups.

The aqueous mixture of urea, formaldehyde and ammonia can be prepared from the individual components, i.e., a commercially available formaldehyde solution and urea in any convenient form. However, it can also be prepared by adding urea to an already partially condensed urea formaldehyde reaction product such as UF Concentrate 85 prepared in accordance with U.S. Patent 2,652,377 and the term "aqueous mixture" mentioned above is meant to include mixtures prepared in this manner.

The amount of ammonia necessary varies within the range 0.3 to 6% by weight of the total urea and formaldehyde. It has been found that the use of too much ammonia as well as insufficient ammonia results in a product which does not have the desired stability at low temperatures. About 0.7 to 3%, by weight, is employed when the urea:formaldehyde mol ratio is in the range 1.3:1 to 1.8:1 in accordance with the preferred embodiment of this invention. The ammonia may be employed in liquid or gaseous form, either anhydrous or in aqueous solution. It is to be noted that the ammonia is not used merely to provide the desired pH, since this is the function of the strong alkali. In fact, the ammonia by itself would not maintain the pH at the desired level. Rather, the presence of ammonia during the heating step has been found to give a product having superior stability as compared with products similarly prepared but without added ammonia.

The best results are obtained when at least about 50% of the ammonia, and preferably all of it, is added before or during the first heating stage. Otherwise, the order in which the components are added is of little consequence. Usually the urea and formaldehyde are mixed in water and then the ammonia is added.

Sufficient water should be used to dissolve all of the components during the heating step. However, the use of more than 50%, by weight, water is undesirable as it necessitates a prolonged evaporation step.

Heating is preferably commenced within a few minutes after preparation of the mixture. It has been found that when the mixture is permitted to stand for extended periods, even at room temperature, prior to heating, the resulting product is not uniformly stable.

The mixture is heated or cooked at a temperature between 75° C. and its boiling point and at substantially atmospheric pressure for a total time of about 30 to 180 minutes. The preferred temperature range is 85° to 95° C. at which temperatures a cook period of about 75 to 115 minutes is used. The amount of time, of course, decreases as the heating temperature increases.

The first heating stage is carried out until at least about 90% of the formaldehyde is in combined form (or, conversely, no more than 10% of the formaldehyde is present as free formaldehyde) with at least 60% of the formaldehyde in the form of methylol compounds. The percentage of combined formaldehyde can by determined by the sodium sulfite method described in "Formaldehyde," Walker, 2nd edition, p. 382. By carrying this test out at 0° C. the amount of free formaldehyde can be determined. By carrying the same test out at 80° C., the combined amount of free and methylol formaldehyde can be determined. From the results of these tests the percentages of methylol formaldehyde and methylene formaldehyde can be determined. For the purpose of the present invention all formaldehyde which is neither free nor in methylol form is considered to be in methylene form. The end point in the second heating stage can also be determined using the 80° C. sodium sulfite method, or an 80° C. alkaline peroxide method, described in Walker, p. 384 can be used.

Another method for determining the end point of the heating is an acetone titration test. A 10 ml. sample of the mixture is concentrated at reduced pressure to a urea-formaldehyde content of about 80 to 90%, preferably about 85% and is mixed with 20 ml. of methanol. The resulting mixture is then titrated at room temperature with acetone until it becomes turbid. The amount of acetone needed to cause turbidity has been found to be related to the salting out temperature of the urea formaldehyde concentrate. The heating should be continued until a sample becomes turbid with the addition of a predetermined amount of acetone. If more than the predetermined amount of acetone is required, the salting out temperature of the mixture is above 0° C. The amount of acetone required to cause turbidity will vary slightly depending, for example, on the amount of water in the mixture. Products prepared in accordance with the preferred conditions of the present invention require about 30 to 34 ml. of acetone.

Any strong alkaline material may be used to control the pH during heating. In the preferred method of carrying out the present invention, an alkali metal hydroxide is gradually added to the reaction mixture at a rate sufficient to maintain the pH in the range 8.5 to 10 until the desired percentage of combined formaldehyde is achieved. Then the addition of hydroxide is discontinued and the pH drops rather quickly to below 8.5, and stays below that level during the remainder of the heating. Usually the addition of the alkaline material is discontinued about 50% to 80% of the way through the total heating period.

When the heating is completed, the water content at this point may vary between about 15% and about 45%, by weight, depending upon the starting materials used. If the amount of water is greater than 20% by weight, the mixture should be concentrated under subatmospheric pressure at about 35° to 90° C. until a clear solution containing at least 80% urea and formaldehyde is obtained. If there is to be a hold between heating step and the evaporating step, the mixture is advantageously cooled below about 45° C. before holding. The final product should also be quickly cooled before storage.

The pH of the final cooled product should be in the range 9 to 10 preferably about 9.6. If necessary the product can be adjusted to this pH by the addition of a sufficiently strong alkaline material.

It has also been found desirable to add a small amount, about 0.05% to 1.0% by weight, of ammonia to the final product to further increase stability.

The clear solutions of the present invention can be used in numerous instances where urea and formaldehyde are required. They are particularly well suited for the production of fertilizers by being mixed with other fertilizer ingredients.

The following examples illustrate modes of carrying out the process of the present invention.

Example I

First, 23,408 parts of 50% urea solution at about 40° C. are charged to an agitated reactor. Sufficient 16% sodium hydroxide solution is added to adjust the pH to about 9. Next, 7,320 parts of 50% formaldehyde solution and 966 parts of 29% ammonia solution are added to the reaction mix. The urea:formaldehyde:ammonia mol ratio is 1.6:1:0.135. Reactor temperature is held at 40° C. or below during the charging operations, which is about two hours. The mixture is then heated to 90° C., the cook temperature. When the temperature reaches 75° C., addition of 16% caustic solution is resumed at a controlled rate to maintain pH in the range of 9.2 to 9.4. Caustic addition is stopped when 95% of the formaldehyde is in combined form, with 65% as methylol formaldehyde, an overall total of 818 parts of 16% solution having been added. This usually occurs about 70 minutes after start of the cook period. Heating is continued at about 90° C. for a total of 90 minutes at which time 70% of the total formaldehyde is in the form of methylene groups. The clear cooked solution having a pH of 7.6 is cooled to 40° C. and then concentrated in an evaporator at 40 mm. Hg abs. pressure and 37° C. thus producing 18,330 parts of concentrate. The concentrate is cooled to 25° C. The product has a pH of 8.6, a viscosity of about 25 centipoises, and a salting-out temperature below 0° C. It is clear and stable for more than a month at ambient temperatures and for at least a week at 0 °C.

A portion of the product is intimately mixed with 0.35% ammonia. This material is stable at ambient temperatures for at least 3 months and at 0° C. for at least 5 weeks.

Example II

First, 2,700 parts of pebbled, uncoated urea, 2,472 parts of 37% stabilized formalin and 103 parts of anhydrous ammonia are charged into a stirred reactor. The mol ratio of urea to formaldehyde to ammonia in the mixture is 1.5 to 1.0 to 0.18. Sufficient 50% sodium hydroxide solution is added to raise the pH to 9.8, and the solution is heated to 90° C. The solution is maintained at 90° C. for 70 minutes during which time the pH is controlled between 9.0 and 9.6 by subsequent incremental addition of 50% sodium hydroxide solution. Heating is continued for an additional 20 minutes without further addition of NaOH, during which time the pH drops rapidly to below 8.5 and then slowly to 7.15. At the end of the cook, 107 parts of 50% sodium hydroxide solution have been added. The clear, cooked solution is then cooled to 31° C. It is concentrated in an evaporator at 40° C. and 45 mm. Hg to yield 4,400 parts of solution. The concentrate having a pH of 8.6 is clear and stable for more than seven weeks at 20° to 25° C. The salting-out temperature is below 0° C.

Example III

First, 2,748 parts of pebbled, uncoated urea, 1,646 parts of UF Concentrate 85 (a non-resinous reaction product containing 25% urea, 60% formaldehyde, 15% water), 281 parts water and 75.2 parts anhydrous ammonia are charged into a stirred reactor. The mol ratio of urea to formaldehyde to ammonia in the mixture is 1.6 to 1.0 to 0.134. The mix is heated to 90° C., its cook temperature. About 75 parts of 50% sodium hydroxide is added continuously during the first 40 minutes of cook to maintain pH at about 9. The solution is cooked for an additional 20 minutes at 90° C. to complete the one-hour cook period during which time the pH falls to 7.6 and then it is cooled to ambient temperature. The 4,825.2 parts of concentrate having a pH of 8.55 is clear and stable for more than seven weeks. The salting-out temperature is below 0° C.

Example IV

This example demonstrates the preparation of a 20-10-5 grade of fertilizer using the urea-formaldehyde concentrate of the present invention.

The following materials at an average temperature of 35° C. are fed to a rotary mixer on a continuous basis:

257 lbs./hr. ammoniated superphosphate.
376 lbs./hr. ammoniated triple superphosphate.
148 lbs./hr. KCl (60% $K_2O$).
250 lbs./hr. vermiculite.
20 lbs./hr. dolomite.
4,200 lbs./hr. recycled dried material from a subsequent step.

About 1,094 lbs./hr. of urea-formaldehyde concentrate prepared as in Example I are also charged to the mixer together with 153 lbs./hr. of 94% $H_2SO_4$. An average of about 10 minutes is required for material to pass through the mixer. At a point just before the material discharges from the mixer, aqua ammonia (28% $NH_3$) is added at the rate of 87 lbs./hr. to essentially neutralize the $H_2SO_4$. The mixture is dried to a product temperature of 95° C., cooled and screened in conventional equipment. About 2,100 lbs./hr. of fertilizer in the particle size range of through 6 mesh Tyler screen and retained on a 14 mesh Tyler screen is withdrawn as product and the remainder of the dried material is recycled to the mixer. Analysis of the product by standard AOAC tests is as follows:

| | |
|---|---|
| Total N _____ percent__ | 20.3 |
| Water-insoluble N _____ do____ | 8.0 |
| Activity index _____ | 50 |
| Total $P_2O_5$ _____ percent__ | 10.2 |
| Citrate-insoluble $P_2O_5$ _____ do____ | 0.10 |
| $K_2O$ _____ do____ | 5.0 |
| $H_2O$ _____ do____ | 1.0 |

Example V

This example illustrates the use of the product effluent from a urea synthesis plant as the source of urea. This is quite convenient, since the synthesis liquor contains a small amount of ammonia as well as a substantial amount of water.

Urea synthesis liquor 3,000 parts (75.6% urea, 0.26% free $NH_3$) was charged to a 5 liter reaction flask. To this solution at 82° C. and pH 8.8 was added 1,377 parts of 50.1% formaldehyde solution during 17 minutes. Addition of 177 parts of 280% NaOH was started simultaneously with the formaldehyde and added during 56 minutes to maintain the pH between 8.5 and 9.0. After the NaOH, 218 parts of 29% $NH_3$ were added in 3 minutes. The resulting mixture was heated at 90° C. for 90 minutes after starting the addition of formeldehyde. The pH was 8.1 at the end of the cook. Then the reaction mixture was cooled to 30° C. and evaporated at reduced pressure to 85% solids. The product was a clear liquid with viscosity 25 centipoises at 25° C., pH 9.6, salting out temperature of below 0° C., total N 30.8%, total formaldehyde 19.6% and urea:formaldehyde ratio 1.6.

We claim:

1. A process for producing a stable aqueous urea formaldehyde concentrate solution which comprises preparing an aqueous mixture of urea and formaldehyde having a urea:formaldehyde mol ratio above 1:1 but less than 2:1, adding ammonia in an amount of 0.3 to 6% by weight, heating said mixture at a temperature between about 75° C. and boiling while maintaining the pH of said mixture in the range about 8.5 to 10 by the addition of strong alkali until at least 90% of the formaldehyde is in combined form, with at least 60% in the form of methylol compounds, and discontinuing the addition of alkali and continuing said heating until at least 50% and no more than 80% of the formaldehyde is in the form of methylene groups.

2. The process of claim 1 wherein the mixture is heated at a temperature in the range of 85° to 95° C. for a total of about 75 to 115 minutes.

3. The process of claim 1 wherein the pH is maintained in the range 9 to 9.6 by the addition of alkali.

4. The process of claim 1 wherein the ammonia content is 0.7 to 3%.

5. The process of claim 1 wherein the addition of strong alkali is discontinued when the heating is 50 to 80% complete.

6. A process for producing a stable, aqueous urea formaldehyde concentrate solution which comprises preparing a mixture of urea and aqueous formaldehyde in a mol ratio greater than 1:1 but less than 2:1, adding about 0.3 to 6% by weight, ammonia, heating the mixture at about 85° to 95° C. for a total of about 75 to 115 minutes, adding strong alkali at a rate sufficient to maintain the pH of the mixture at about 9.0 to 9.8 until at least 90% of the formaldehyde is in combined form, with 60% in the form of methylol compounds, discontinuing the addition of alkali and continuing said heating until at least 50% of said formaldehyde is in the form of methylene groups, and evaporating the resulting mixture until the water content is no more than 20% by weight.

7. The process of claim 6 wherein about 0.05 to 1.0% by weight of ammonia is added to the concentrated product.

References Cited

UNITED STATES PATENTS

| | | | |
|---|---|---|---|
| 2,467,212 | 4/1949 | Kvalnes | 71—28 X |
| 2,729,611 | 1/1956 | Chesley et al. | 71—28 X |
| 3,092,486 | 6/1963 | Waters et al. | 71—30 |
| 3,235,370 | 2/1966 | Kealy | 71—30 |

S. LEON BASHORES, Primary Examiner

T. G. FERRIS, Assistant Examiner

U.S. Cl. X.R.

71—30, 64